(12) United States Patent
Kalbermatten

(10) Patent No.: US 12,242,230 B2
(45) Date of Patent: Mar. 4, 2025

(54) WATCH GLASS CONTAINING A NEAR-FIELD COMMUNICATION (NFC) MODULE AND METHOD OF PRODUCING SUCH A GLASS

(71) Applicant: Winwatch IP Ltd, Zug (CH)

(72) Inventor: Alex Kalbermatten, Sion (CH)

(73) Assignee: WINWATCH IP LTD., Zug (CH)

( * ) Notice: Subject to any disclaimer, the term of this patent is extended or adjusted under 35 U.S.C. 154(b) by 572 days.

(21) Appl. No.: 17/563,195

(22) Filed: Dec. 28, 2021

(65) Prior Publication Data

US 2022/0206443 A1    Jun. 30, 2022

(30) Foreign Application Priority Data

Dec. 29, 2020    (CH) .................... 01683/20

(51) Int. Cl.
*G04G 21/04*    (2013.01)
*G04B 39/00*    (2006.01)
*H01Q 1/27*    (2006.01)
*H01Q 7/00*    (2006.01)
*H04B 5/77*    (2024.01)

(52) U.S. Cl.
CPC .......... *G04G 21/04* (2013.01); *G04B 39/006* (2013.01); *H01Q 1/273* (2013.01); *H01Q 7/00* (2013.01); *H04B 5/77* (2024.01)

(58) Field of Classification Search
CPC ...... G04G 21/04; G04B 39/006; G04B 39/00; G04B 47/00; H01Q 1/273; H01Q 7/00; G04R 60/04
See application file for complete search history.

(56) References Cited

U.S. PATENT DOCUMENTS

| | | | |
|---|---|---|---|
| 5,768,217 A * | 6/1998 | Sonoda | H01Q 1/38 368/278 |
| 9,680,205 B2 * | 6/2017 | Li | H01Q 1/243 |
| 9,761,951 B2 * | 9/2017 | Kuonanoja | H01Q 9/42 |
| 11,422,514 B2 * | 8/2022 | Zhong | G04R 60/08 |
| 2006/0140058 A1 | 6/2006 | Kalbermatten et al. | |

FOREIGN PATENT DOCUMENTS

| | | |
|---|---|---|
| CH | 692069 A5 | 1/2002 |
| CH | 713968 A2 | 1/2019 |
| EP | 1597636 A | 11/2005 |
| EP | 2495621 A1 | 9/2012 |

* cited by examiner

*Primary Examiner* — Edwin A. Leon
(74) *Attorney, Agent, or Firm* — BLANK ROME LLP

(57) ABSTRACT

A watch glass (1) has a near field communication (NFC) module (3) which includes at least one microcircuit (3.2) connected to an antenna (3.1). A watch (2) is equipped with such a glass (1). A method produces such a watch glass (1).

15 Claims, 3 Drawing Sheets

WATCH GLASS CONTAINING A NEAR-FIELD COMMUNICATION (NFC) MODULE AND METHOD OF PRODUCING SUCH A GLASS

RELATED APPLICATION

The present application claims the benefit of Swiss Application No. CH01683/20, filed Dec. 29, 2020. The entire disclosure of which is hereby incorporated by reference.

TECHNICAL FIELD OF THE INVENTION

The invention relates to a watch glass containing an NFC (Near Field Communication) module. Such a watch glass can, for example, make it possible to equip a watch with an NFC module, in order to use said watch as a contactless means of payment by bringing the watch close to a payment reader (POS terminal) to make payment, or, in order to improve the traceability of the watch throughout its lifespan (e.g. the traceability of the watch in the supply chain), or, to make the watch more counterfeit-proof, or, to offer services and functions to the wearer of the watch, such as, for example, access control wherein the watch functions as an access key permitting physical access to the wearer, or wherein the watch functions to provide a digital identification of the wearer permitting digital access to the wearer. The invention also relates to a method of producing such a watch glass. Finally, the invention relates to a watch comprising such a watch glass.

STATE OF THE ART

It is known to provide a watch, for example a wristwatch, with an NFC (near-field communication) module. Such a module provides the watch with new functionalities allowing so-called contactless communication with its environment. The module typically consists of a microcircuit connected to an antenna. In general, in the state of the art, such an NFC module is placed in the watchcase, in the bracelet, in the bezel or even in the watch glass. Such a glass is described in patent CH692069. However, this patent is silent on how to integrate a transponder into the glass of a watch and therefore lacks clarity in such a way that a person skilled in the art cannot execute it. A method of integrating an electronic module into the glass of a watch is described by patent EP1597636B1. This method of process was filed above all for the integration of electronic modules of very small sizes, for example of a size equal to or less than 0.4 mm2 as indicated in its description. The volume of material to be machined to integrate a very small electronic module is necessarily low. On the other hand, the integration of a larger-sized NFC module immediately becomes a technical headache. A major drawback in this process is that it is difficult to properly machine a recess around the periphery but in particular in the side face of the watch glass, especially if the glass is made of a hard material that is difficult to work with, such as the sapphire crystal (corundum). Machining with CNC tools risks damaging the glass, which is made of a very brittle hard material, resulting in microcracks, chipping or chipping on the edges during the machining performed in the glass and making it optically and aesthetically unusable. In addition, the area above the sidewall of the recess, in which often the chamfer is shaped (chamfer which is the small area formed by a cut edge), may crumble or worse yet, may break throughout the zone of the edge and of the chamfer thus weakened by the eroding, respectively by the milling with a CNC tool, which renders the glass unusable and leads to significant losses in work pieces and high production costs. Only a machining in a watch glass thicker than a usual watch glass, or by a very slow eroding work by the CNC tool can partially reduce these risks. But this slow motion work will necessarily result in long production times and therefore high production costs for producing and will pose technical and aesthetic problems of integrating a thicker watch glass into a watch. Another disadvantage of this proposed method is the lack of flexibility in the shaping of the groove which is only very limited, for the most part only a recess with a simple shape such as for example a linear groove worked horizontally by CNC machining with a Diamond disc, often V-shaped is suitable, or simple round drilling is possible. However the biggest drawback is posed by the impossibility of machining a notch in the groove, in which the integrated circuit of the NFC module will need to be positioned in view of its large size, if it is a question of a microprocessor with external capacitor currently necessary for contactless payment for example, and as sought to be solved by the present invention. A machining is not possible to be carried out properly by the method disclosed by patent EP1597636B1, because no CNC tool is currently suitable for this kind of milling to create the notch horizontally in depth in the groove. Machining the groove and notch with vertical sidewalls at right angles (for example L-shaped) so that the NFC module can fill the space in the groove with its antenna and the integrated circuit as much as possible with its antenna and the integrated circuit in the notch, with the least space and size possible, is simply not possible to be executed in the thickness of a side face of the watch glass by the prior art. Because these sidewalls are V-shaped and/or rounded and unworked and the groove and the notch to place the module inside must both be machined larger; and larger the groove and the notch have to be in relation to the size and the thickness of the glass, the more fragile, and unsightly and therefore unsaleable commercially the watch becomes. It should be noted that the machining by laser ablation would theoretically be possible, but would be far too expensive and would take far too much time for the process of ablation of microlayers in the glass. The disadvantage of the absence of a specific notch in which to position the microcircuit or microprocessor generates the need to thicken the machining in order to be able to superimpose the microcircuit or microprocessor on the copper coil forming the antenna, with the consequence of having to insert the NFC module on thicker glasses, thus preventing the glass watch from being use in a range of watches requiring thinner glasses. Machining more deeply to be able to align the copper coil and the microcircuit horizontally would have even more disadvantages, in addition to the technical and economic constraints already listed, the circle containing the NFC module would need to be enlarged around its entire periphery, creating a visual aspect much less discreet and elegant. The absence of a specific notch also makes it necessary to machine a large part of the material which will not contain the NFC module and which will have to be filled again later with an adhesive to fill this void. Finally, another drawback of the method is that it does not make it possible to achieve a satisfactory solution for hiding the module from view in the groove and the notch when the glass is viewed from the top. For example, printing or metallizing an aesthetic coating covering to the eye with or without textual or symbolic decoration is not possible. As the sidewalls cannot be polished and remain rough, a smooth and shiny coating for example, obtained by screen printing or by applying a metallic coating, are not possible and the optical and aesthetic rendering obtained by a cover painting made by hand with a brush or spray, will have a matte appearance, resulting in an imperfect finish and compromising the quality of the end product. Another drawback is that an NFC module type comprising a copper coil forming the circular antenna connected to the integrated circuit forming the NFC module could not be placed as one piece into the recess and the notch. At best, the antenna must be wrapped by hand around the groove, preventing automation and automated production on a large scale. Another solution is proposed by patent application CH 713 968 A2 which attempts to solve this problem by means of an antenna with an extensible and/or reducible structure. But this kind of antenna is unusual and complicated to produce. The prior art therefore does not offer the possibility of carrying out a production of a watch glass with an NFC module in a satisfactory manner for the production of a high-quality watch part (which may comprise sapphire crystal), for use in medium and high-end watches.

SUMMARY OF THE INVENTION

The aim of this invention is to overcome these drawbacks of the prior art by proposing to provide a two-layer (upper layer and lower layer) watch glass containing a near-field communication (NFC) module and a method for producing said watch glass. One of the desired advantages of the present invention is to offer a solution allowing the creation of a notch in a groove which is provided the lower layer. Another sought advantage is being able to manufacture a thinner watch glass. Another advantage sought is the realization of a cover coating of visual quality and irreproachable technical finish and being able to use the cover coating over the notch as an advertising platform on which a logo can be displayed or to affix a mark on it, for example. Said watch glass comprises an NFC module which contains at least one microcircuit or a microprocessor with or without a capacitor, connected to an antenna, and allowing reliable data communication with NFC readers. This inventive device is easily and quickly integrated into a watch, including a metal watch, and is simple to produce and can be produced industrially and standardized in large quantities for different types of watches in different materials and at an economical cost. To this end, the invention relates to a multicomponent watch glass, which comprises the characteristics mentioned in independent claim 1.

The present invention relates to a watch glass which comprises two layers bonded together, an upper layer which is made of sapphire or mineral glass on which a cover coating can easily be provided, for example by screen printing or by a metallic coating on an inner surface of the watch glass around a periphery of the watch glass, so that the NFC module is hidden from view from the top, and a bottom layer which is made of sapphire or mineral glass in which a groove and notch can be easily machined with a suitable CNC tool working vertically from the outside inwards and thus allowing even milling of the groove and notch with complex geometries and with straight sidewalls, in which an NFC module can be precisely arranged, said NFC module containing a microcircuit or a connected microprocessor to an antenna. The antenna is positioned in the groove, and the microcircuit or microprocessor is positioned inside the notch, before the two layers are bonded together with a glue, such as, for example, an optically transparent UV adhesive which is an adhesive which polymerizes under the action of the ultraviolet, or with any other glue and or suitable adhesive such as optically transparent liquid adhesive (LOCA). According to one of the multiple possible embodiments, the sidewalls of the groove and those of the notch are coated with a cover dielectric coating, such as, for example, an opaque black paint, which serves to hide the NFC module from view when the watch (which contains the watch glass) is viewed from below ensuring thus a clean finish to the watch. According to one of the many possible embodiments, a decoration may be imprinted on a periphery of the upper layer; the imprinted decoration may comprise an electrically conductive thin-film metallization, functioning as a booster amplifier antenna to the antenna.

A variant of the non-limiting embodiment of the invention with a dielectric cover coating on the sidewalls of the groove and of the notch in the lower layer is defined in claim 4. A variant of the non-limiting embodiment of the invention with an amplifying booster antenna formed by the cover coating on the lower surface of the upper layer is defined in claim 5. Another variant of the embodiment of the invention provides for the addition of a ferrite sheet located below the NFC module in the groove and is defined in claim 7.

A possible variation of the invention relates to a cost-effective watch glass which comprises two layers (which define an upper layer and lower layer respectively) bonded together, the upper layer is made of sapphire crystal (corundum), and the lower layer is made of mineral glass. Another possible execution of the invention relates to a watch glass which comprises two layers (which define an upper layer and lower layer respectively) glued together, the upper layer is made of mineral glass and the lower layer is made of mineral glass.

To this end, the invention also relates to a method of producing a watch glass containing an NFC module described above, and which comprises the characteristics mentioned in independent claim 9. Further embodiments of the method are defined in the dependent claims 10, 11 and 12.

To this end, the invention also relates to a watch comprising the watch glass containing an NFC module described above, as mentioned in the independent claim 13.

BRIEF DESCRIPTION OF THE FIGURES

The aims, advantages and characteristics of various embodiment of a watch glass containing an near-field communication (NFC) module, according to the invention, will be described, by way of example only, and illustrated by the drawings in which:

FIG. 1.1 is a side view of the watch glass assembled according to the invention;

FIG. 2.1 is a sectional view of the upper layer of the watch glass according to the invention;

FIG. 2.2 is a perspective view of the upper layer of the watch glass according to a possible variant of the invention with an auxiliary amplifier antenna;

FIG. 3.1 is a sectional view of the lower layer of the watch glass according to the invention;

FIG. 3.2 is a sectional view of a watch glass according to the prior art;

FIG. 3.3 is a sectional view of the lower layer of the watch glass according to the invention;

FIG. 3.4 is a sectional view of a watch glass according to the prior art;

FIG. 4.1 is a perspective view of the NFC module placed in the lower layer of the watch glass according to the invention;

FIG. 4.2 is a sectional view of the NFC module arranged in the lower layer of the glass which comprises a covering coating made in the groove and the notch, according to a variant of the invention;

FIG. 5.1 is a sectional view of the assembled watch glass comprising a ferrite sheet according to a variant of the invention;

FIG. 6.1 is a flow chart showing the steps of a method for producing a watch glass containing an NFC module according to a variant of the invention;

FIG. 6.2 is a flow chart representing the steps of a method for producing a watch glass containing an NFC module according to a variant of the invention;

FIG. 6.3 is a flow chart showing the steps of a method for producing a watch glass containing an NFC module according to a variant of the invention.

DETAILED DESCRIPTION OF THE INVENTION

Figure 1:
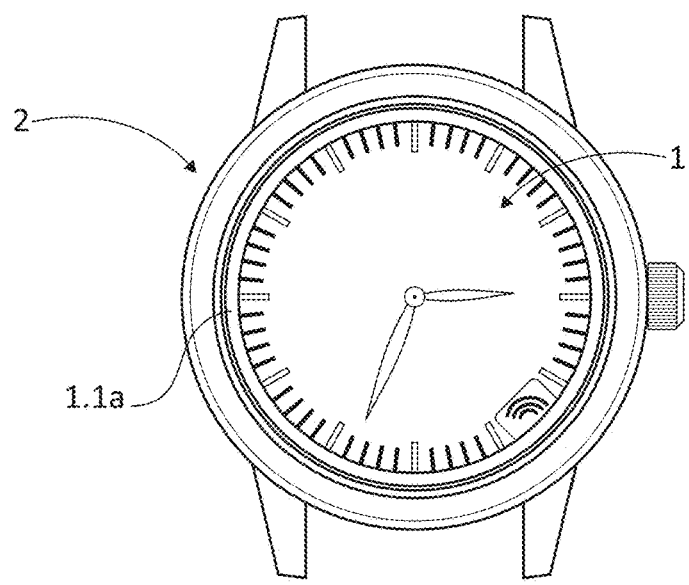
FIG. 1 is a perspective view of a watch comprising the watch glass with the NFC module according to the invention.
Figure 1:
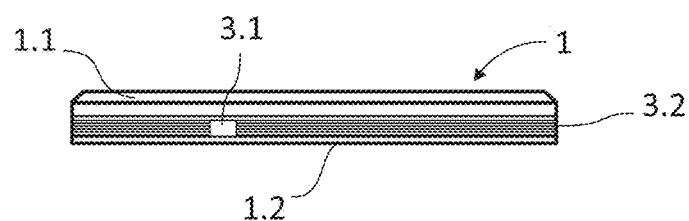

The FIG. 1 represents a watch 2, such as, for example, a wristwatch of analog or digital or analog-digital type, or watch of hybrid type, provided with a watch glass 1 according to the present invention; the watch glass 1 has a multicomponent structure; the watch glass 1 may comprise a sapphire material (corundum) or mineral or organic or any other transparent material. The watch glass 1 has a cover coating 1.1*a*; the watch 2 equipped with the watch glass 1 is easily recognizable as the cover coating 1.1*a* is visible on the periphery of said watch glass 1. Thus, any watch 2 equipped with such a watch glass 1 containing a near-field communication (NFC) module 3 offers new functionalities, such as, for example, using said watch 2 as a contactless payment device by simply bringing the watch close to a payment reader (POS terminal) to proceed with the payment, and/or, in order to improve its traceability of the watch throughout the lifespan of the watch (e.g. the traceability of the watch in the supply chain), and/or, to make the watch more counterfeit-proof, and/or to offer services and functions to the wearer of the watch, such as, for example functioning as a key for access control or functioning as a digital identification of the wearer. The NFC module 3 embedded in the glass 1 is also able to connect to an external NFC reader which is often integrated in a smartphone or a tablet or a PC, when it is located at a very short distance from said NFC module 3, and can transmit to the external NFC reader a radio frequency (RF) signal relating to the information and/or data about the watch or the person wearing the watch.

FIG. 1.1 shows a side view of the watch glass 1 produced according to the invention with an upper layer 1.1 bonded to a lower layer 1.2, comprising the NFC module 3, comprising at least one microcircuit 3.1, which can be an integrated circuit (IC) or a microprocessor with or without an external capacitor, connected to an antenna 3.2 in the form of a circular copper coil. The microcircuit 3.1 may therefore also include, or not, an external capacitor not shown in the drawing, as needed. This watch glass 1 is easily and quickly integrated into a watch 2 (such as a metal watch for example). The watch glass 1 may comprise a chamfer defined in an outer surface of the upper layer 1.1 and a chamfer defined in a bottom surface of the lower layer 1.2. The watch glass 1 is inserted into the watch case (preferably into the middle of the watch case) in the same way as a sapphire or mineral glass of the prior art is inserted into a watch case, namely by means of a gasket, for example a thermoplastic elastomer gasket such as made of Hytrel, or by an adhesive gasket.

Figure 2:
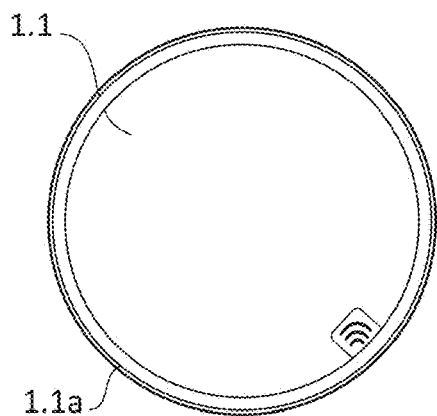
FIG. 2 is a perspective view of the upper layer of the watch glass according to the invention.
Figure 2:
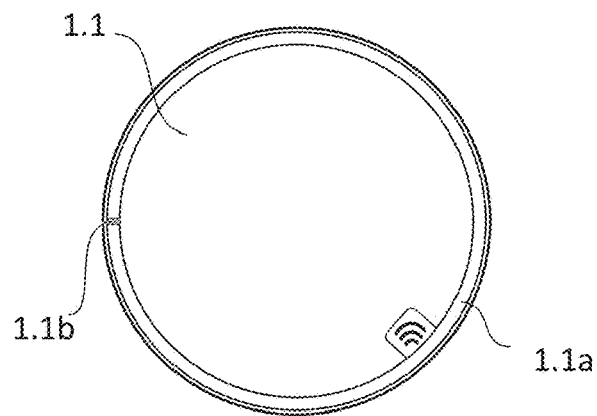
Figure 2:
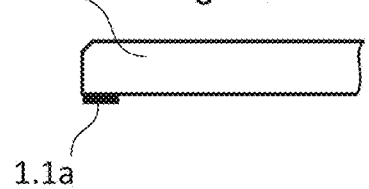

FIG. 2 and FIG. 2.1 show a perspective view of the upper layer 1.1 and a sectional perspective view of the upper layer 1.1, respectively. Said upper layer 1.1 may comprise a sapphire (corundum) or mineral or organic material and may comprise on its inner surface a covering coating 1.1*a* on the periphery of the glass. This cover coating 1.1*a*, produced, for example, by a screen printing process or by a process of coating and/or metal surface treatment on its inner surface around the periphery to hide the NFC module 3 from view when the watch glass is viewed aerially (i.e. from the top). It should be noted that the two surface treatment (by a screen printing process or by a process of coating and/or metal surface treatment on its inner surface around the periphery to hide the NFC module) and cover coating processes are well suited for this type of production, given their very low thickness which will not compromise bonding between the upper layer 1.1. and lower layer 1.2 thereafter, and will not compromise the resistance of the upper layer 1.1. and lower layer 1.2 to aging and UV radiation. Screen printing or metallization of the cover coating will improve its aesthetic appearance, and also therefore improves the aesthetic appearance of the watch, and also allows the possibility of adding a textual or symbolic decoration to the cover coating, for example, a logo or an indicator applied in the part of the cover coating that covers the notch.

FIG. 2.2 shows the upper layer 1.1 of watch glass 1 according to a possible variant of the invention, that is to say with the cover coating adapted to become an amplifying antenna (booster) for an antenna 3.2. By providing the cover coating with a metallic coating which is electrically conductive and which is split, so that a gap is defined, an amplifying antenna is obtained. The gap can be any suitable size; for example the width of gap may be between 0.1 mm to several millimeters; the width of the gap may be adaptable; preferably the width of the gap depends on the fine adjustment of the antenna 3.2. A metallic coating with a split, which provides the gap, will function as a booster amplifier antenna and give an aesthetically pleasing metallic shine and luster. It should be noted that the cover coating produced by screen printing with an electrically conductive ink, or by metallization, but without providing a split (which defines a gap), will also function as an amplifying antenna which can act as a supplement to antenna 3.2; however, such a cover coating will be significantly less efficient and effective.

Figure 3:
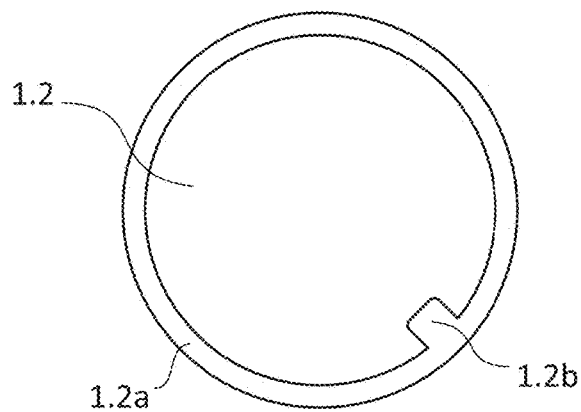
FIG. 3 is a perspective view of the lower layer of the watch glass according to the invention.
Figure 3:
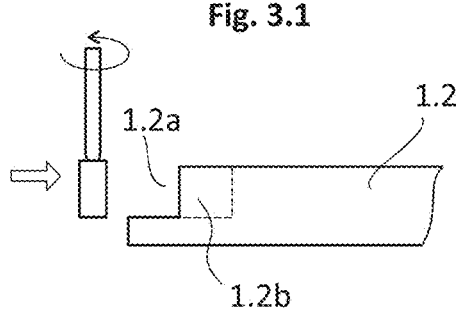
Figure 3:
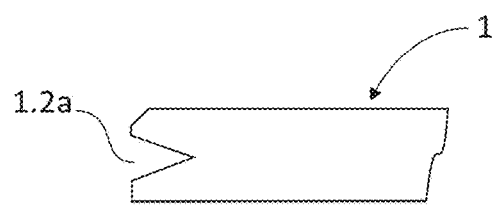
Figure 3:
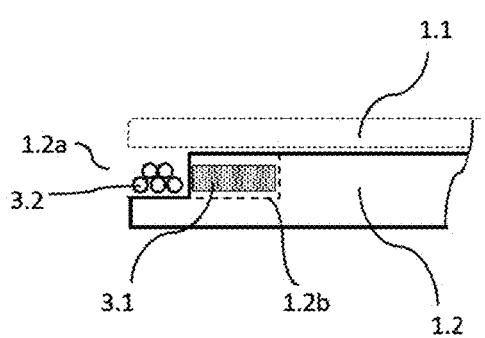
Figure 3:
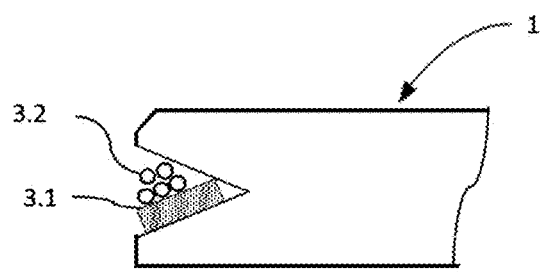

FIG. 3 and FIG. 3.1 show a perspective view of the lower layer 1.2, and a sectional view of the lower layer 1.2, respectively. Said lower layer 1.2 can be made from a sapphire (corundum) or mineral or organic material. A groove 1.2*a* and a notch 1.2*b* are formed on an outer periphery of the lower layer 1.2. The machining of the groove 1.2*a* is carried out quickly and precisely with a suitable CNC tool by drilling and/or milling, for example with a cylindrical diamond drill or a cylindrical milling tip, progressing from an outside edge of the layer lower 1.2 towards an inside of the layer lower 1.2, to excavate the groove 1.2a, and the notch 1.2b, without causing microcracks, cracks and splinters in the working substrate, even if it is a hard very-brittle-like sapphire crystal (corundum). According to the invention, walls which define the groove and/or walls which defined the notch, are vertical and are without rounding. Such walls can be formed using a high-speed CNC tool and the production time is short and therefore production costs will be low for producing.

An advantage of the present invention is that great flexibility in the geometric structuring of the groove 1.2a and notch 1.2b is ensured. An advantage of having the walls which define the groove and/or notch as vertical, and without rounding, is that the groove 1.2a, and the notch 1.2b have a smaller footprint and can receive the NFC module 3; a further advantage is that optical aspects are improved and the aesthetic appearance of the watch glass (and watch which uses the watch glass) is improved. Impeccable workmanship is required for such a high-quality watchmaking piece used for entry-level, mid-range and high-end watches. It should be noted that laser ablation machining is also possible to perform this work.

Advantageously, the walls which define the groove 1.2a and the walls which define the notch 1.2b are coated with a dielectric coating, such as, for example, an opaque black paint, which will serve to hide the NFC module 3 from view from the bottom, thus ensuring a clean finish of the product.

FIG. 3.2 illustrates very well the limitations imposed by the prior art in machining a groove in a prior art watch glass. As the milling and/or drilling shape is often a V-shape or U-shape or rounded shape, the reduced volume of the excavation requires a deeper and thicker groove which makes it impossible to produce a watch glass 1 which is thin (small thickness) and which has a groove which can receive an NFC module 1. Advantageously, as shown in FIG. 3.3, in the present invention the microcircuit or microprocessor 3.1 can be located in the notch 1.2b and the antenna 3.2 positioned horizontally with respect to said microcircuit or microprocessor 3.1 in the groove 1.2a, and the NFC module 3 integrated in thin glass of a thickness corresponding to the thickness of glass commonly used for conventional type watches.

In contrast, FIG. 3.4 demonstrates the constraint of the prior art which is the need to superimpose the microcircuit or microprocessor 3.1 and the antenna 3.2 in the groove. In the prior art lateral alignment of the microcircuit or microprocessor 3.1 and the antenna 3.2 in the groove requires machining deeper thereby requiring a glass of increased thickness.

Figure 4:
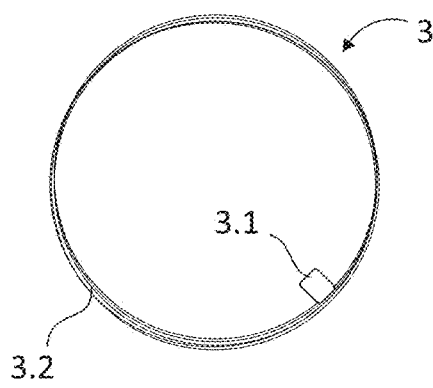
FIG. 4 is a perspective view of the NFC module in the watch glass according to the invention.
Figure 4:
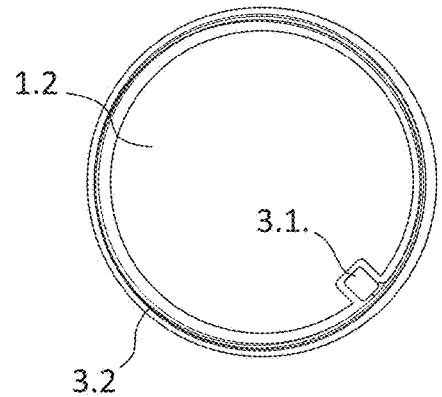
Figure 4:
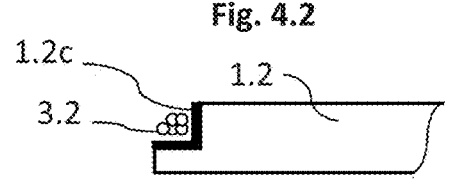

FIG. 4 shows the NFC module 3 which contains at least one microcircuit or a microprocessor 3.1 connected to an antenna 3.2 formed of a circular copper coil, allowing reliable data communication with NFC readers (not shown on the drawing). A possible variant of this non-limiting embodiment may be to provide an NFC module 3 which further comprises an external capacitor located close to the microcircuit or the microprocessor 3.1 and also being located in the notch 1.2b.

FIG. 4.1 shows the NFC module 3 located in the lower layer 1.2. The antenna 3.2 is located in the groove 1.2a, and the microcircuit or microprocessor 3.1 is located in the notch 1.2b.

Figure 5:
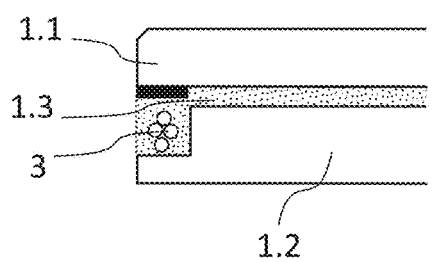
FIG. 5 is a sectional view of the watch glass assembled according to the invention.
Figure 5:
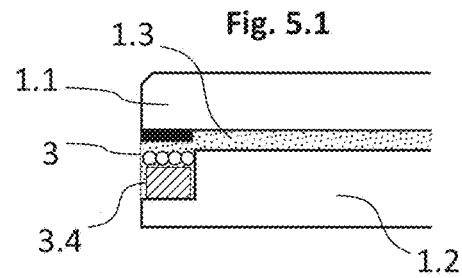

FIG. 5 shows schematically the upper layer 1.1 and the lower layer 1.2 bonded together by an adhesive or glue 1.3, for example, with an optically transparent UV glue which is a glue which polymerizes under the action of the ultraviolet, or with any other adhesive and/or suitable adhesive of the optically transparent liquid adhesive (LOCA) type. The UV lamp allows quick drying, finalizing the assembly of the two layers.

FIG. 5 shows the NFC module 3 sandwiched between the upper layer 1.1 and the lower layer 1.2; the NFC module 3 is glued and sealed in the notch 1.2b. It should be noted that the groove 1.2a is also preferably filled and sealed by the glue. 1.3. Depending on need, the groove 1.2a, if it is not properly and/or completely filled and sealed by the adhesive/glue 1.3, can be sealed with a dielectric filler which may comprise a dielectric material, such as, for example, epoxy resin for encapsulating and/or sealing electronic components, or any other multicomponent or organic material suitable as an electrical insulator for this type of sealing.

FIG. 4.2 shows a non-limiting embodiment of the invention, wherein a dielectric cover coating is provided on the walls of the groove 1.2a and on the walls of the notch 1.2b. The dielectric cover coating may be, for example, an opaque black paint, which has the advantage of hiding the NFC module from view, when watch glass is viewed below, thus ensuring a clean finish to the product.

FIG. 5.1 shows another non-limiting embodiment of the invention, wherein a ferrite sheet 3.4 is provided on a bottom surface of the groove and/or on a bottom surface of the notch 1.2b, which functions as a magnetic shield, useful, in particular, when magnetic shielding is necessary, such as, for example, in certain metal watches or in watches comprising metal components.

Figure 6:
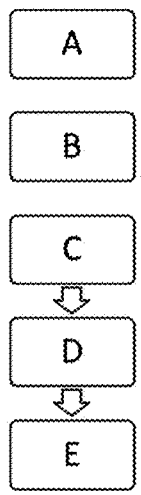
FIG. 6 is a flow chart showing steps of a method of producing a watch glass containing an NFC module according to the invention.
Figure 6:
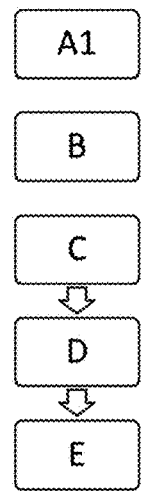
Figure 6:
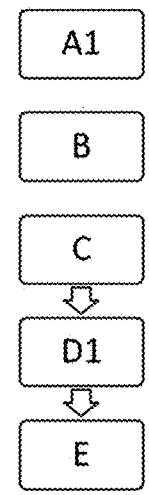
Figure 6:
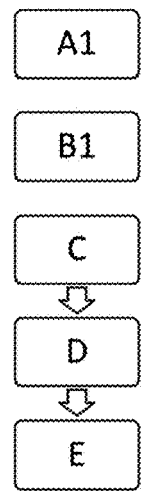

A method of producing a watch glass containing an NFC module 3 according to the invention will now be described with reference to FIG. 6. The watch glass containing an NFC module 1 is illustrated in FIGS. 1 and 1.1. The method comprises the initial steps A, B, C during which, respective, the upper layer 1.1, the lower layer 1.2 and the NFC module 3, are separately produced. The order in which the upper layer 1.1, the lower layer 1.2 and the NFC module 3 are made (i.e. the order of these three steps A, B, C) is not limiting.

During step A, the upper layer 1.1 is produced, as needed with or without chamfer, and as needed with or without anti-reflective (AR) coating, as is practiced in the production of watch glasses. FIG. 2 and FIG. 2.1 show a perspective view of the upper layer 1.1 and a, a sectional view of the upper layer 1.1 respectively. Said upper layer 1.1 comprises a sapphire (corundum) or mineral or organic material and on its inner surface a cover coating 1.1a provided on a periphery of the upper layer 1.1. This cover coating 1.1a, is for example produced by screen printing or by metallization and may, as required, also include a textual or symbolic decoration, such as, for example a logo or an indicator applied in the part of the cover coating which covers the notch 2.1 b.

During a following step B, the lower layer 1.2 is produced, as required with or without a chamfer, and as required with or without anti-reflective coating (AR), as is practiced in the production of watch glasses. FIG. 3 and FIG. 3.1 show a perspective view of the lower layer 1.2 and a sectional view of the lower layer 1.2 respectively. Said lower layer 1.2 comprises a sapphire (corundum) or mineral or organic material. A groove 1.2a and a notch 1.2b are machined horizontally in an outer periphery of the lower layer 1.2. The machining of the groove 1.2a is carried out with a suitable CNC tool by drilling and/or milling, for example, with a cylindrical diamond drill or a cylindrical milling tip, progressing from an outside of the edge of the lower layer to the inside, so as to dig the groove 1.2a and the notch 1.2b which have the same level, or, so that the groove 1.2a and the notch 1.2b have a different depths to adapt to the thickness of the microcircuit or microprocessor 3.1 and the thickness of the antenna 3.2. By milling and/or drilling with the CNC tool with a suitable drill from the top, see FIG. 3.1, the walls of the groove 1.2*a* and those of the notch 1.2*b* are made vertical, smooth and without rounded corners or else arched, and the bottom surface of the groove 1.2*a* and notch 1.2*b* are flat and level.

During a next step C, the NFC module 3 is produced in one piece, as is done in the industry for the producing of air coil transponders for various solutions in NFC or RFID technology. FIG. 4 shows the NFC module 3 which is composed of a microcircuit or a microprocessor 3.1 connected to an antenna 3.2 formed of a circular copper coil of the air coil type. As needed, an external capacitor can also be provided which is placed between the antenna 3.2 and the microcircuit or microprocessor 3.1.

In the next step D, the NFC module 3 is placed in the groove 1.2*a* and in the notch 1.2*b* of the lower layer 1.2. FIG. 4.1 and FIG. 4.2 show the NFC module 3 which is positioned in the lower layer 1.2. The antenna 3.2 is positioned in the groove 1.2*a*, and the microcircuit or microprocessor 3.1 is positioned in the notch 1.2*b*.

In the final step E, the upper layer 1.1 and lower layer 1.2 are glued together. As shown schematically in FIG. 5, the upper layer 1.1 is glued to the lower layer 1.2 by an adhesive or a glue 1.3, such as, for example, an optically transparent UV glue which is a glue which polymerizes under the action of the ultraviolet, or with any other glue and or suitable adhesive such as optically transparent liquid adhesive (LOCA). The UV lamp, not shown in the drawing, allows rapid curing of the US glue, thereby finalizing the assembly of the two layers. FIG. 5 shows the NFC module 3 sandwiched between the upper layer 1.1 and lower layer 1.2 and is located in the notch 1.2*b* and the notch 1.2*b* is sealed (preferably with glue); The groove 1.2*a* is also sealed (preferably with glue. It should be noted that the groove 1.2*a* may be filled and sealed with the glue. 1.3. In some embodiments, the groove 1.2*a*, if it is not properly and/or completely filled and sealed by the adhesive 1.3, can be sealed with a dielectric filler which may comprise a dielectric material, such as, for example, epoxy resin for encapsulating and/or potting electronic components, or any other multicomponent or organic material suitable as an electrical insulator for this type of sealing.

A possible variant of the method for producing a watch glass, having an NFC near-field module 3, according to the presentation invention is described with reference to FIG. 6.1. During step A1, the upper layer 1.1 is produced, as needed with or without a chamfer, and as needed with or without anti-reflective (AR) coating, using methods know in the field of watch glass production. FIG. 2.1 shows the upper layer 1.1 in a sectional view. Said upper layer 1.1 comprises a sapphire (corundum) or mineral or organic material and on an inner surface of the upper layer 1.1 is provided with a cover coating 1.1*a* at a periphery of the upper layer 1.1. FIG. 2.2 shows the upper layer 1.1 according to a possible variant of the invention, wherein the cover coating is adapted to function as a amplifying booster antenna which can supplement the antenna 3.2. The cover coating is preferably produced by a metallic multicomponent treatment, and is electrically conductive; a gap 1.1*b* is defined in the cover coating so that the cover coating creates an amplifying antenna. The gap 1.1*b* may have any suitable width; preferably the width of the gap is between 0.1 mm minimum to several millimeters maximum, depending on the need for fine adjustment with the antenna 3.2. It should be noted that the cover coating functioning as an auxiliary amplifying antenna can also be produced by screen printing with an electrically conductive ink, or by metallization but without necessarily providing a gap, provided that it will be less efficient. The following steps B to E remain identical to those described above in the producing process according to FIG. 6 and will not be repeated here.

Another possible variant of the method for producing a watch glass having an NFC module 3, according to the invention, is described with reference to FIG. 6.2. During step D1 a ferrite sheet 3.4 is inserted into the groove 1.2*a* and the notch 1.2*b*; then the NFC module 3 is positioned on said ferrite sheet 3.4 in the groove 1.2*a* and the notch 1.2*b* of the lower layer 1.2. FIG. 5.1 shows the ferrite sheet 3.4 placed on a bottom surface of the groove and/or in the notch 1.2*b*; the ferrite sheet 3.4 functions as a magnetic shield, which is useful when magnetic shielding is necessary, as is the case, for example, in some metal watches or watches comprising metal components which interfere with the transmission of data between said NFC module 3 and the external NFC reader. The other steps remain identical to those described in one or the other producing process according to FIG. 6 or FIG. 6.1 described above, and will not be repeated here.

Finally, a possible variant of the method for producing a watch glass having an NFC module 3 according to the invention is described with reference to FIG. 6.3. During step B1, the walls which defined the groove 1.2*a* and the walls which defined the notch 1.2*b* are coated with a dielectric coating, such as for example, an opaque black paint, which hide the NFC module from view when the watch glass is viewed from the bottom, ensuring thus a clean finish of the product.

It will be understood that various modifications and/or improvements and/or combinations obvious to a person skilled in the art can be made to this non-limiting embodiment and of these variants, of these producing methods and of the variants of the invention set out above without departing from the scope of the invention defined by the appended claims.

The invention claimed is:

1. A watch glass comprising a near field communication module (NFC), the NFC module containing at least one microcircuit or a microprocessor connected to an antenna, wherein the watch glass comprises a lower layer comprising a groove in its upper periphery and a notch which is located in a lateral extension of the groove, and wherein the microcircuit or microprocessor is positioned in the notch, and wherein the antenna is positioned in the groove; and an upper layer comprising on its inner periphery a cover coating, said cover coating being positioned precisely on the groove and the notch during when the two layers are being bonded together, in order to hide the NFC module.

2. The watch glass according to claim 1, wherein the upper layer and/or the lower layer is made of a sapphire, corundum, or mineral or organic material or any other optically transparent material.

3. The watch glass according to claim 1, wherein walls defining the groove and/or walls defining the notch of said lower layer are machined vertically.

4. The watch glass according to claim 1, wherein the depth of the groove is different to the depth of the notch.

5. The watch glass according to claim 1, wherein walls defining the groove and walls defining the notch are coated with a cover dielectric coating.

6. The watch glass according to claim 1, wherein the cover coating is made of an electrically conductive material forming an additional amplifying antenna, wherein said amplifying antenna is in addition to the antenna of the NFC module, and wherein the cover coating may be in the shape of a split ring or in the shape of a ring.

7. The watch glass according to claim 1, wherein the NFC module is placed integrally in the groove and notch of the lower layer.

8. The watch glass according to claim 1, wherein the lower layer comprises a ferrite sheet placed in the groove and/or in the notch and wherein the ferrite sheet functions as a shield.

9. A method of producing a watch glass which comprises two layers, which define an upper layer and lower layer respectively, bonded together and an NFC module which contains at least one microcircuit or a microprocessor connected to an antenna, the method comprising the following steps:
   produce the upper layer which comprises on its inner periphery a cover coating;
   produce the lower layer by machining a groove in an upper periphery of the lower layer and machining a notch located in a lateral extension of the groove;
   produce from a single piece, the NFC module comprising at least one microcircuit or a microprocessor connected to an antenna;
   place the NFC module in the groove and notch of the lower layer;
   bond together the upper layer with the lower layer, positioning the cover coating on the groove and the notch when the two layers are glued, in order to conceal the NFC module.

10. The method of claim 9, wherein the method comprises providing the upper layer with a cover coating made of an electrically conductive material forming an additional amplifying booster antenna which is in addition to the antenna of the NFC module, and wherein the cover coating may be in the shape of a split ring or in the shape of a ring.

11. The method of claim 9, wherein the method comprises placing first a ferrite sheet in the groove and/or in the notch of the lower layer, then secondly placing the NFC module on said ferrite sheet.

12. The method according to claim 9, wherein the method comprises coating walls defining the groove and walls defining the notch, with a cover dielectric coating.

13. A watch comprising the watch glass according to claim 1.

14. The watch glass according to claim 1, wherein the two layers are bonded together with an adhesive.

15. The method according to claim 9, wherein the upper layer is bonded together with the lower layer with an adhesive.

* * * * *